United States Patent
Wlassuk

(10) Patent No.: US 10,773,616 B2
(45) Date of Patent: Sep. 15, 2020

(54) VEHICLE SEATING SYSTEM

(71) Applicant: Lear Corporation, Southfield, MI (US)

(72) Inventor: Gerald Wlassuk, Sindelfingen (DE)

(73) Assignee: Lear Corporation, Southfield, MI (US)

( * ) Notice: Subject to any disclaimer, the term of this patent is extended or adjusted under 35 U.S.C. 154(b) by 162 days.

(21) Appl. No.: 15/953,978

(22) Filed: Apr. 16, 2018

(65) Prior Publication Data

US 2018/0304780 A1 Oct. 25, 2018

(30) Foreign Application Priority Data

Apr. 21, 2017 (DE) .................. 10 2017 206 751

(51) Int. Cl.
| | | |
|---|---|---|
| *B60N 2/56* | (2006.01) | |
| *B60N 2/68* | (2006.01) | |
| *B60N 2/58* | (2006.01) | |

(52) U.S. Cl.
CPC ........... *B60N 2/565* (2013.01); *B60N 2/5642* (2013.01); *B60N 2/58* (2013.01); *B60N 2/686* (2013.01)

(58) Field of Classification Search
CPC ...... B60N 2/565; B60N 2/5657; B60N 2/686; A47C 7/285; A47C 7/282
See application file for complete search history.

(56) References Cited

U.S. PATENT DOCUMENTS

| | | | | |
|---|---|---|---|---|
| 5,013,089 | A * | 5/1991 | Abu-Isa | A47C 7/282 |
| | | | | 297/452.64 |
| 6,027,171 | A * | 2/2000 | Partington | B60N 2/0232 |
| | | | | 297/452.18 |
| 6,277,023 | B1 | 8/2001 | Schwarz | |
| 8,011,729 | B2 | 9/2011 | Petzel et al. | |
| 8,226,166 | B2 | 7/2012 | Petzel et al. | |
| 8,474,908 | B2 | 7/2013 | Petzel et al. | |
| 8,474,917 | B2 | 7/2013 | Line et al. | |
| 2005/0231019 | A1* | 10/2005 | Gryp | A47C 7/40 |
| | | | | 297/452.18 |
| 2010/0001572 | A1* | 1/2010 | Masunaga | A47C 7/282 |
| | | | | 297/452.29 |
| 2011/0121628 | A1* | 5/2011 | Kauffman | B60N 2/686 |
| | | | | 297/354.1 |

(Continued)

FOREIGN PATENT DOCUMENTS

| | | | |
|---|---|---|---|
| DE | 10161082 A1 * | 7/2003 | ........... B60N 2/5825 |
| DE | 10326446 A1 | 10/2004 | |

(Continued)

OTHER PUBLICATIONS

Search Report for German Patent Application No. 10 2017 206 751.9 dated Dec. 22, 2017.

*Primary Examiner* — Timothy J Brindley
(74) *Attorney, Agent, or Firm* — Brooks Kushman P.C.

(57) ABSTRACT

A vehicle seating system having a seat back includes a back panel with a first side having a first surface and a second side having a second surface. A plurality of stanchions are disposed on the first surface and extend outwardly therefrom. The stanchions form airflow channels between them. A trim cover is disposed over at least a portion of the second side and extends to the first side. The trim cover is disposed over the stanchions such that it covers a portion of the airflow channels and the stanchions maintain at least a portion of the trim cover away from the first surface.

20 Claims, 3 Drawing Sheets

(56) References Cited

U.S. PATENT DOCUMENTS

| | | | |
|---|---|---|---|
| 2013/0165033 A1 | 6/2013 | Fitzpatrick et al. | |
| 2013/0307311 A1* | 11/2013 | Morio | A47C 3/023 |
| | | | 297/452.18 |
| 2015/0145313 A1* | 5/2015 | Lee | B60N 2/682 |
| | | | 297/452.18 |
| 2016/0009206 A1 | 1/2016 | Perraut et al. | |
| 2018/0126885 A1* | 5/2018 | Hartmann | B60N 2/682 |
| 2018/0126886 A1* | 5/2018 | Line | B60N 2/80 |
| 2019/0344687 A1* | 11/2019 | Tait | B60N 2/565 |

FOREIGN PATENT DOCUMENTS

| | | |
|---|---|---|
| DE | 102009025697 A1 | 1/2010 |
| DE | 102009057072 A1 | 6/2011 |
| DE | 102012002645 A1 | 4/2013 |
| DE | 102015010661 A1 | 3/2016 |

\* cited by examiner

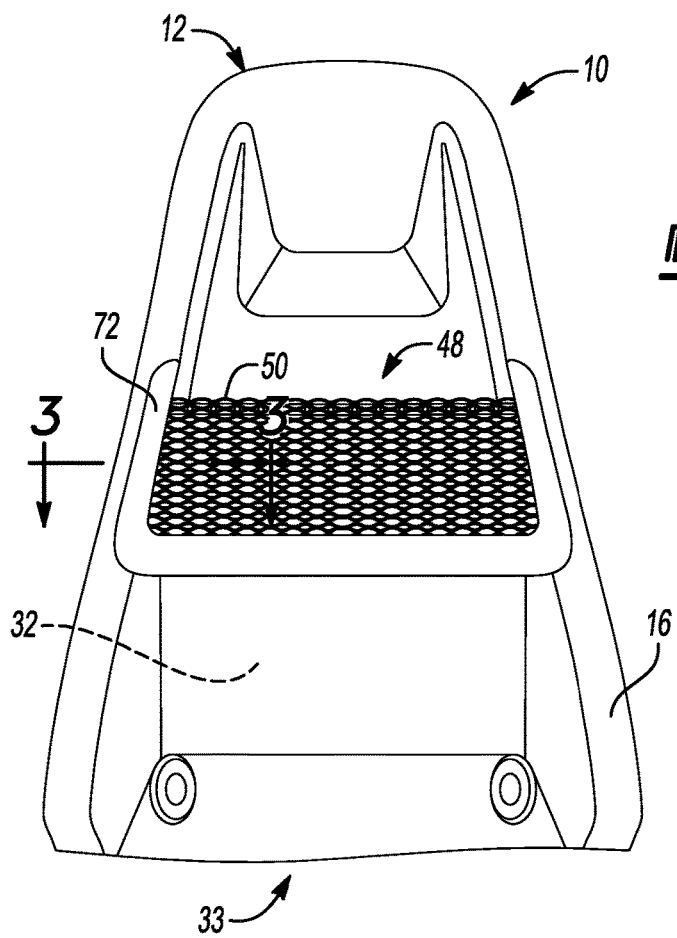
*Fig-2*
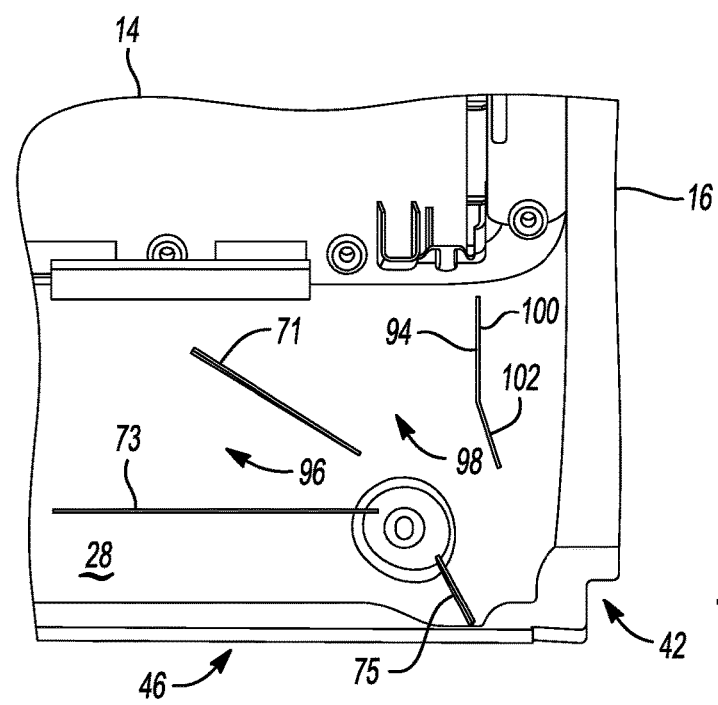
*Fig-4*
*Fig-5*

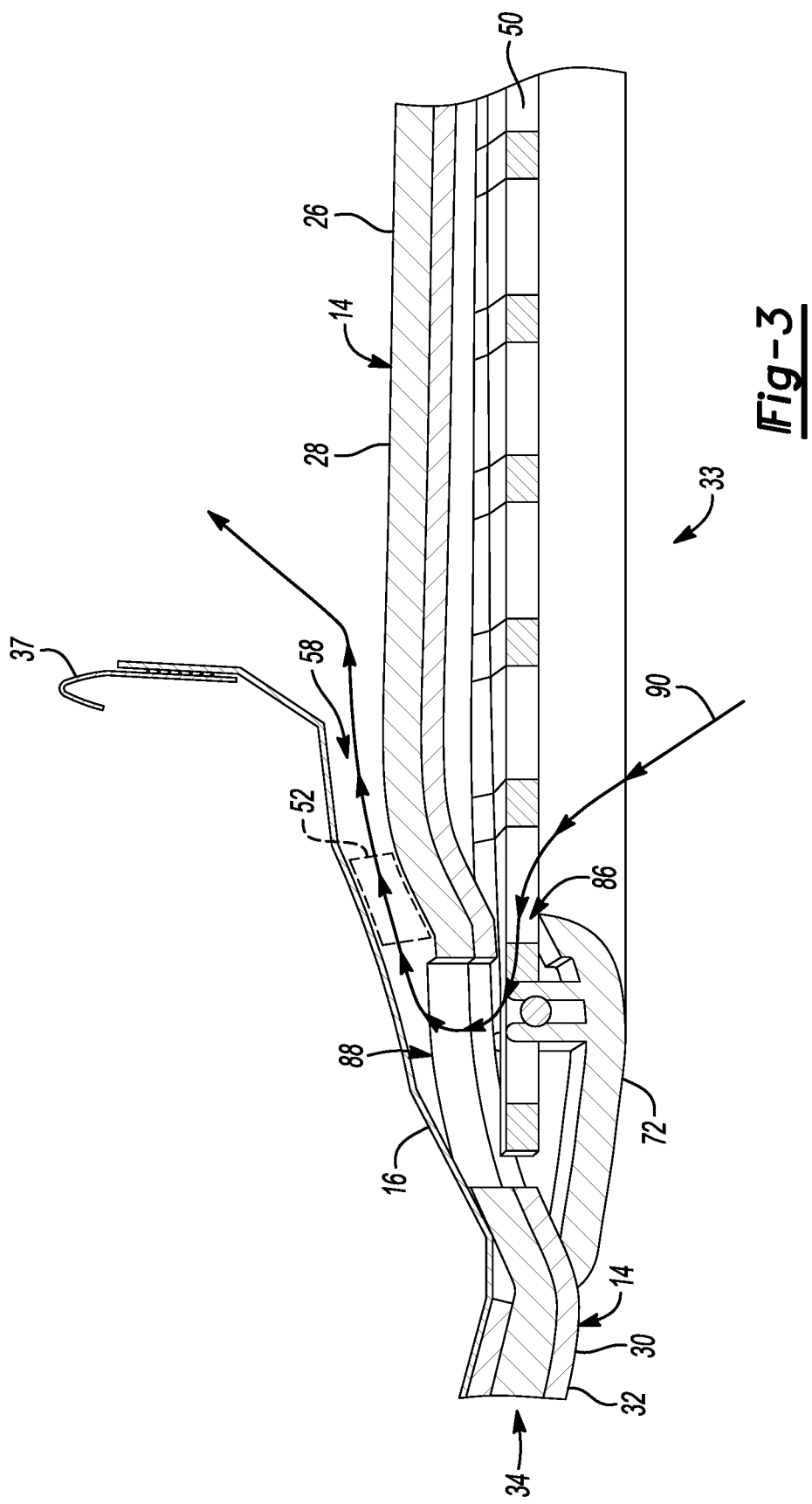

US 10,773,616 B2

VEHICLE SEATING SYSTEM

CROSS-REFERENCE TO RELATED APPLICATIONS

This application claims foreign priority benefits under 35 U.S.C. § 119(a)-(d) to DE 10 2017 206 751.9, filed Apr. 21, 2017, the disclosure of which is hereby incorporated by reference in its entirety.

TECHNICAL FIELD

The present disclosure relates to a vehicle seating system with air intake ports.

BACKGROUND

A number of vehicle seating systems having air intake ports are known. Examples of such systems may be found in one or more of the following references: DE102015010661, DE102009025697, and U.S. Pat. No. 8,474,908. In order to provide inlets for air into a seating ventilation system, some seats have relatively large openings in a trim cover, typically disposed at the back of the seat so they are less noticeable. Because it may be undesirable to have trim cover openings in some seat designs, a need exists for a vehicle seating system that includes one or more intake ports for receiving air for a seating ventilation system that does not require large openings in the trim cover.

SUMMARY

Embodiments disclosed herein may include a vehicle seating system having a seat back including a back panel with a first side having a first surface and a second side having a second surface. A plurality of stanchions are disposed on the first surface and extend outwardly therefrom. The stanchions form airflow channels between them. A trim cover is disposed over at least a portion of the second side and extends to the first side. The trim cover is disposed over the stanchions such that it covers a portion of the airflow channels and the stanchions maintain at least a portion of the trim cover away from the first surface.

Embodiments disclosed herein may include a vehicle seating system having a seat back including a back panel with a first surface facing a front of the seat back and a second surface facing a rear of the seat back. A pair of stanchions is disposed on one of the first surface or the second surface, and extends outwardly therefrom. The stanchions are spaced apart from each other to form a channel between them. A trim cover is disposed over at least a portion of the other one of the first surface or the second surface, and extends to and is disposed over at least a portion of the pair of stanchions such that at least a portion of the trim cover is spaced-apart from the one of the first surface or the second surface by the pair of stanchions.

Embodiments disclosed herein may include a vehicle seating system having a seat back including a back panel having a first surface and a second surface. A plurality of stanchions extend outward from the first surface, and a trim cover is disposed over at least a portion of the stanchions such that at least a portion of the trim cover is held away from the first surface by the stanchions.

BRIEF DESCRIPTION OF THE DRAWINGS

FIG. 2 shows a back of the seating system of FIG. 1, including a net pocket and a net frame;

FIG. 3 shows a cross-sectional view of a portion of the seating system taken through cut-line 3-3 shown in FIG. 2;

FIG. 4 shows a detail view of a portion of the seating system shown in FIG. 1; and FIG. 5 shows a detail view of another portion of the seating system shown in FIG. 1.

DETAILED DESCRIPTION

Figure 1:
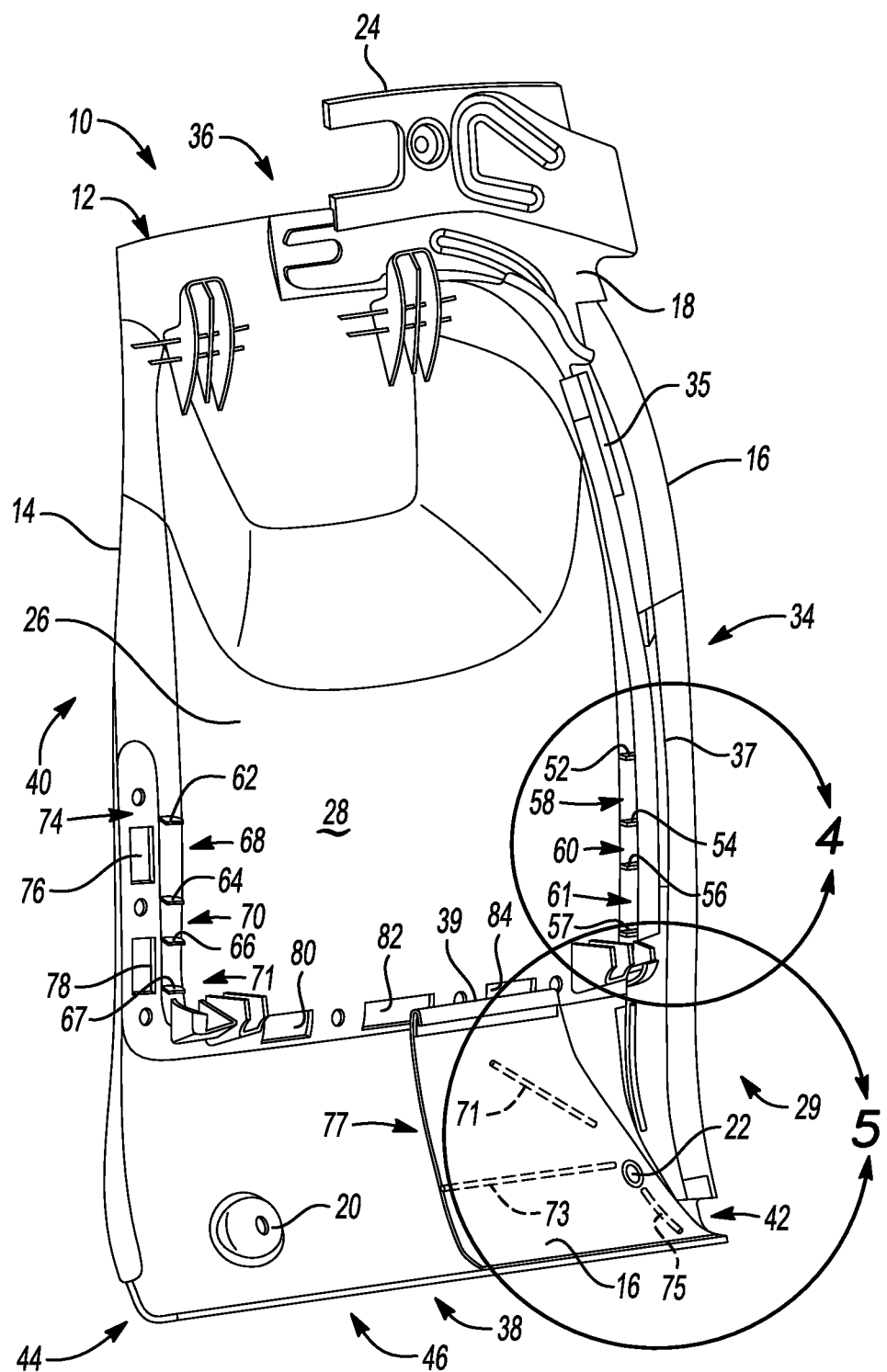
FIG. 1 shows a vehicle seating system in accordance with embodiments described herein, including several stanchions disposed between a back panel and a trim cover.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 shows a vehicle seating system 10 in accordance with embodiments described herein. The seating system 10 includes a seat back 12, including a back panel 14 and a trim cover 16, which may be a single piece of material or made from several pieces. A portion of a frame 18 of the seat back 12 is also shown; the back panel 14 may be attached to the frame 18, for example, with bolts, snaps or some other fastening system. The back panel 14 includes two holes 20, 22, which may accommodate bolts or other fasteners. Also shown in FIG. 1 is a portion of a headrest frame 24. The back panel 14 has a first side 26 having a first surface 28, which, in the embodiment illustrated in FIG. 1, is a front surface of the back panel 14 and faces a front 29 of the seat back 12. The back panel 14 also includes a second side 30 having a second surface 32—see FIG. 3—which, in the embodiment illustrated in FIG. 1, is a rear surface of the back panel 14 and faces a rear 33 of the seat back 12.

As shown in FIG. 1, the trim cover 16 is wrapped around a right side 34—using the orientation of the drawing figure—and a portion of a top edge 36 and a bottom edge 38. It is understood that the trim cover 16 would in practice be wrapped around most or all of the top edge 36 and the bottom edge 38, and would also be wrapped around a left edge 40. The trim cover 16 may be secured to the frame 18 by generally U-shaped portions sewn onto an edge of the trim cover as known in the art. Three such U-shaped portions 35, 37, 39 are shown in FIG. 1 and may, for example, cooperate with part of the frame 18 to secure the trim cover 16. Although the trim cover 16 may be wrapped around most of the edges of the back panel 14, an opening 42 is formed where the trim cover 16 is wrapped around the right edge 34 and where it is wrapped around the bottom edge 38. A similar opening 44 is also formed on the other side of the back panel 14 where the trim cover 16 wraps around the left edge 40 and the bottom edge 38. As explained in more detail below, the openings 42, 44, both of which are proximate to a bottom portion 46 of the back panel 14, provide inlets for air that can be used in a ventilation system for the seating system 10.

FIG. 2 shows the rear 29 of the seat back 12, which is almost entirely covered by the trim cover 16. Thus, the trim cover 16 is disposed over at least a portion of the second side 30 of the back panel 14, and extends to the first side 26 as shown in FIG. 1. In the embodiment shown in FIG. 2, the trim cover 16 is attached to the back panel 14 so that it is tightly in contact with the rear surface 32. In at least some embodiments, a trim cover, such as the trim cover 16 may be made from a thermoplastic olefin (TPO) or some other polymer, and then heated and vacuum-formed over a back panel such as the back panel 14. In contrast, embodiments described herein provide a system that allows the trim cover 16 to be held away from the front surface 28 of the back panel 14. In the embodiment shown in FIG. 1, this is accomplished by several stanchions 52, 54, 56, 57 disposed along the right side 34 of the back panel 14.

A first pair of the stanchions 52, 54 form an airflow channel 58 between them, and a second pair of the stanchions 54, 56 form another airflow channel 60 between them. Finally, a third pair of the stanchions 56, 57 form an airflow channel 61 between them. The stanchions 52, 54, 56, 57 extend outwardly from the front surface 28 of the back panel 14. Although they may be formed integrally with a back panel, such as the back panel 14, in the embodiment shown in FIG. 1, the stanchions 52, 54, 56, 57 are formed separately from the back panel 14 and are attached to the back panel 14 through a heat-staking process. In order to form the channels 58, 60, 61 the stanchions 52, 54, 56, 57 are spaced-apart from each other along a length of the back panel 14. With the orientation shown in FIG. 1, a length of the back panel 14 is oriented in a top-to-bottom or bottom-to-top direction, while a width of the back panel 14 is oriented from the left side 40 to the right side 34, or vice versa.

As shown in FIG. 1, the trim cover 16 is disposed over a portion of the stanchions 52, 54, 56, 57 so that it covers a portion of the channels 58, 60, 61. As described above, the channels 58, 60, 61 are airflow channels that allow air to move through the seating system 10 as part of a ventilation system, which is described in more detail below. Along the left side, and more particularly proximate to the left edge 40 of the back panel 14, are stanchions 62, 64, 66, 67. The stanchions 62, 64, 66, 67, like their counterparts on the right side of the back panel 14, are spaced-apart from each other along a length of the back panel 14 so that channels are formed between them. More particularly, an airflow channel 68 is formed between a first pair of the stanchions 62, 64; another airflow channel 70 is formed between a second pair of the stanchions 64, 66; and a third airflow channel 71 is formed between a third pair of the stanchions 66, 67. On the left side of the back panel 14 the trim cover 16 is removed from the drawing figure to show additional features of the back panel 14.

Because the stanchions 52, 54, 56, 57 are disposed proximate to a right side 34 of the back panel 14, and the stanchions 62, 64, 66, 67 are disposed proximate to the left side 40 of the back panel 14, these stanchions may be conveniently referred to as "side stanchions". This may help to distinguish them from other stanchions in the seating system 10, which are described in more detail below, particularly in conjunction with the bottom portion 46 of the back panel 14. Each of the side stanchions 52, 54, 56, 57, 62, 64, 66, 67 are configured as elongated members having a length positioned transversely across a length of the back panel 14. With this orientation, the channels 58, 60, 61, 68, 70, 71 are oriented along a width of the back panel 14. Such an orientation does not necessarily imply that the channels 58, 60, 61, 68, 70, 71 are perfectly parallel to an axis across the width of the back panel 14 that is perpendicular to an axis along the length of the back panel 14, but rather, describes the channels 58, 60, 61, 68, 70, 71 as being oriented so that the airflow going through them moves across the width of the back panel 14 instead of directly up or down along the length of the back panel 14.

In the embodiment shown in FIG. 1, eight stanchions 52, 54, 56, 57, 62, 64, 66, 67 are visible—four on each side—but in some embodiments, a seating system, such as the seating system 10, may have more or fewer stanchions on each side as are required or desirable for the particular application. The stanchions 52, 54, 56, 57, 62, 64, 66, 67 may vary in height along their length, but may extend away from the front surface 28 of the back panel 14 by approximately 3-5 millimeters (mm) at their highest points. Any pair of the stanchions 52, 54, 56, 57 proximate to the right edge 34 may be separated from each other by 15-30 mm, although in other embodiments, pairs of stanchions may have greater or less separation depending on the application. The same or a similar configuration may apply to pairs of the stanchions 62, 64, 66, 67 proximate to the left edge 40. Any of the side stanchions described herein may have an overall length that is chosen based in part on its position on the back panel; in some cases, the length may be 12 mm or less, and in other cases 30 mm or more. Increasing the number of side stanchions may increase the number of airflow channels, but in some embodiments it may be desirable to include only a single side stanchion to provide a small airflow channel having a generally triangular opening.

In addition to the side stanchions 52, 54, 56, 57, 62, 64, 66, 67 shown in FIG. 1, the seating system 10 also includes several stanchions disposed near the bottom portion 46 of the back panel 14. Three of these "bottom stanchions" 71, 73, 75 are shown disposed below a bottom portion of the trim cover 16. The stanchions 71, 73 form a pair of stanchions that are spaced-apart from each other and form a channel 77 therebetween. The channel 77 is in fluid communication with the opening 42 near the bottom right side of the seat back 12. Similar bottom stanchions may be disposed toward the left edge 40 of the back panel 14 so as to form at least one channel in fluid communication with the opening 44 near the bottom left side of the seat back 12. Bottom stanchions are illustrated and described in more detail in conjunction with FIG. 5. Thus, the openings 42, 44 provide ingress for airflow through the bottom channels to facilitate operation of a ventilation system for the seating system 10. For the side channels 58, 60, 61, 68, 70, 71 inlets for the airflow may come from the rear 33 of the seat back 12.

As shown in FIG. 2, the seat back 12 has a net pocket 48 that includes a netting material 50 held in place by a frame arrangement 72. The frame arrangement 72 is disposed over a portion of the rear side 32 of the back panel 14, which is below the trim cover 16 in FIG. 2. The frame arrangement 72 is generally U-shaped, and corresponds to a forwardly-extending portion 74 of the back panel 14 shown in FIG. 1. In the embodiment shown in FIG. 1, the forwardly extending portion 74 is an embossed portion of the back panel 14 formed during the molding process. As shown in FIG. 1, the embossed portion 74 includes several apertures 76, 78, 80, 82, 84. It is understood that additional apertures are disposed proximate to the channels 58, 60 on the right side of the seat back 12 below the trim cover 16.

FIG. 3 shows a cross-sectional view of a portion of the seating system 10 taken through cut-line 3-3 shown in FIG. 2. As shown in FIG. 3, the frame arrangement 72 is attached to the second side 32 of the back panel 14 such that a gap 86 is formed between the frame arrangement 72 and the second side 32 of the back panel 14. Also shown in FIG. 3 is one of the apertures 88 that is disposed through the embossed portion 74 of the back panel 14—see also FIG. 1.

The aperture 88 is below the trim cover 16 along the right edge 34 of the back panel 14 in the illustration shown in FIG. 1. In this embodiment, it is configured similarly to the aperture 76 shown along the left edge 40 of the back panel 14. The gap 86 formed between the frame arrangement 72 and the back panel 14 is in fluid communication with the airflow channel 58.

To better illustrate the airflow channel 58, the stanchions along the right edge 34 of the back panel 14 have been removed from FIG. 3, although one of the stanchions 52 is shown in phantom to illustrate how it maintains the trim cover 16 away from the front surface 28 of the back panel 14. Thus, an airflow 90 may be received into the seating system 10 from the rear side 33 of the seat back 12 through the gap 86, and through one or more of the airflow channels, such as the channel 58. The seating system 10 may contain one or more fans to draw the airflow 90 into the seat back 12. A foam pad may be positioned over the front surface 28 of the back panel, and a back side of the foam pad may have a portion removed to allow the airflow 90 to enter through the gap 86 and the channels, such as the channel 58. A front side of the foam may also have a portion removed—for example, in the form of grooves in the foam—to allow the airflow out toward a seated occupant. The trim cover 16 may contain perforations at least on a front side so that the airflow through the grooves moves through the perforations and out toward the seated occupant.

FIG. 4 shows a detail of a portion of the seating system 10 shown in FIG. 1. Specifically, it shows the right edge 34 of the back panel 14, and the side stanchions 52, 54, 56, 57 holding the trim cover 16 away from the front surface 28 of the back panel 14. As shown in FIG. 4, the airflow channel 58 formed by the stanchions 52, 54 is in fluid communication with the aperture 88 formed in the embossed portion 74 of the back panel 14. With reference to FIG. 3, it is shown that the aperture 88 fluidly connects the gap 86 with the airflow channel 58. Similarly, an aperture 92 formed in the embossed portion 74 the back panel 14 is in fluid communication with the channel 61, and fluidly connects the channel 61 to the gap 86. Embodiments described herein also contemplate air intake coming into the seating system 10 from a front side 29 of the seat back 12. This is illustrated further in FIG. 5.

FIG. 5 shows a detail of another portion of the seating system 10 shown in FIG. 1 with much of the trim cover 16 removed to show features of the back panel 14. Specifically, FIG. 5 illustrates stanchions and airflow channels disposed near a bottom portion 46 of the back panel 14. Shown in detail in FIG. 5 are the bottom stanchions 71, 73, 75, which were also illustrated and described in conjunction with FIG. 1. Further shown in FIG. 5 is another bottom stanchion 94. The bottom stanchions 71, 73, 75, 94 form several airflow channels that may direct airflow throughout the seating system 10 after it is received through the opening 42. One pair of the stanchions 71, 73 forms an airflow channel 96, while another pair of the stanchions 71, 94 form another airflow channel 98.

The stanchions 71, 73, 75, 94 are configured as elongated members in a spaced-apart relation to each other to form the channels 96, 98. In the embodiment shown in FIG. 5, the stanchions 71, 73, 75 form straight guides for the airflow entering through the opening 42. In contrast, the stanchion 94 is angled, and more specifically, formed by two straight pieces 100, 102, which help to guide the airflow through the channel 98 in the desired direction. The stanchions 71, 73, 75, 94 may be configured as separate pieces and attached to the back panel 14, for example, by heat staking; conversely, they could be formed with a portion of the back panel 14 during a molding process. The stanchions 71, 73, 75, 94 vary in height along their length, and may extend outwardly from the front surface 28 of the back panel 14 by 8-12 mm at the highest points. In other embodiments, they may extend outwardly by more or less than this amount depending on the desired design parameters for the particular seating system. The stanchions 71, 73, 75, 94 are generally longer than the side stanchions, and may have lengths in a range of 25-120 mm.

The size, shape and number of stanchions used in various embodiments described herein may be modified to accommodate different seating systems and different ventilation systems so as to provide an appropriate level of air intake so that large air intake openings through a trim cover may be minimized or eliminated. As described above, the stanchions illustrated and described herein may be manufactured separately from the back panel and attached to it in a post-processing operation. In such an application, it may be beneficial or otherwise desirable to have the stanchions manufactured from a material that is the same or similar to the material of the back panel. In other embodiments, however, the stanchions may be made from different types of material, even softer materials, such as felt, as long as they are effective to keep the trim cover away from the surface of the back panel to allow airflow behind the trim cover.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seating system, comprising:
   a seat back having a back panel with a first side having a first surface and a second side having a second surface, the back panel including at least one aperture therethrough;
   a plurality of stanchions disposed on the first surface, extending outwardly therefrom and forming airflow channels therebetween, at least one of the airflow channels being in fluid communication with at least one of the at least one aperture; and
   a trim cover disposed over at least a portion of the second side and extending to the first side, the trim cover being disposed over the stanchions such that it covers a portion of the airflow channels and the stanchions maintain at least a portion of the trim cover away from the first surface.

2. The vehicle seating system of claim 1, wherein at least some of the stanchions are side stanchions disposed along left and right sides of the back panel and are spaced-apart along a length of the back panel.

3. The vehicle seating system of claim 2, wherein the first side of the back panel faces a front of the seat back and the second side of the back panel faces a rear of the seat back, the vehicle seating system further comprising a frame arrangement disposed over a portion of the second side of the back panel such that a gap is formed between the frame arrangement and the second side of the back panel, the gap being in fluid communication with at least one of the airflow channels.

4. The vehicle seating system of claim 3, wherein the back panel includes a forwardly extending portion having the at least one aperture disposed therethrough, and the frame arrangement is further disposed proximate to the forwardly extending portion such that at least one of the at least one aperture fluidly connects the gap with the at least one airflow channel.

5. The vehicle seating system of claim 2, wherein the side stanchions are elongated members with a length positioned transversely across a length of the back panel.

6. The vehicle seating system of claim 5, wherein the side stanchions are formed separately from the back panel and are fastened thereto.

7. The vehicle seating system of claim 1, wherein at least some of the stanchions are bottom stanchions and are disposed proximate to a bottom portion of the back panel, the trim cover being disposed over the back panel to form an opening proximate the bottom portion of the back panel in fluid communication with at least one of the airflow channels.

8. A vehicle seating system, comprising:
   a seat back having a back panel with a first surface facing a front of the seat back and a second surface facing a rear of the seat back;
   a pair of stanchions disposed on the first surface and extending outwardly therefrom, the stanchions being spaced apart from each other to form a channel therebetween; and
   a trim cover disposed over at least a portion of the second surface and extending to and disposed over at least a portion of the pair of stanchions such that at least a portion of the trim cover is spaced-apart from the first surface by the pair of stanchions.

9. The vehicle seating system of claim 8, wherein the pair of stanchions is disposed proximate to a bottom portion of the back panel, the trim cover being disposed over the back panel to form an opening proximate the bottom portion of the back panel in fluid communication with the channel.

10. The vehicle seating system of claim 8, wherein the pair of stanchions is disposed along a left or right side of the back panel and each stanchion of the pair of stanchions is spaced-apart along a length of the back panel.

11. The vehicle seating system of claim 10, wherein each stanchion of the pair of stanchions is an elongated member with a length positioned transversely across a length of the back panel such that the channel is oriented along a width of the back panel.

12. The vehicle seating system of claim 10, further comprising a frame arrangement disposed over a portion of the second surface such that a gap is formed between the frame arrangement and the second surface, the gap being in fluid communication with the channel.

13. The vehicle seating system of claim 12, wherein the back panel includes an aperture disposed therethrough, and the frame arrangement is further disposed proximate to the aperture such that the aperture fluidly connects the gap with the channel.

14. The vehicle seating system of claim 8, wherein each stanchion of the pair of stanchions is formed separately from the back panel and is fastened thereto.

15. A vehicle seating system, comprising:
   a back panel having a first surface and a second surface;
   a plurality of stanchions extending outward from the first surface, at least two of the stanchions being spaced-apart to form a channel therebetween; and
   a trim cover disposed over at least a portion of the stanchions such that at least a portion of the trim cover is held away from the first surface by the stanchions, the trim cover including a plurality of apertures therein, at least some of the apertures being in fluid communication with the channel.

16. The vehicle seating system of claim 15, wherein at least some of the stanchions are side stanchions disposed along left and right sides of the back panel.

17. The vehicle seating system of claim 16, wherein the first surface faces a front of the back panel and the second surface faces a rear of the back panel, the vehicle seating system further comprising a frame arrangement disposed over a portion of the second surface such that a gap is formed between the frame arrangement and the second surface, the gap being in fluid communication with at least one of the channels.

18. The vehicle seating system of claim 17, wherein the back panel includes a forwardly extending portion having an aperture disposed therethrough, and the frame arrangement is further disposed proximate to the forwardly extending portion such that the aperture fluidly connects the gap with the at least one channel.

19. The vehicle seating system of claim 16, wherein the side stanchions are elongated members with a length positioned transversely across a length of the back panel such that the channels are oriented along a width of the back panel.

20. The vehicle seating system of claim 15, wherein at least some of the stanchions are bottom stanchions and are disposed proximate to a bottom portion of the back panel in a spaced-apart relation to each other to form at least one channel, the trim cover being disposed over the back panel such that an opening is formed proximate the bottom portion of the back panel, the opening being in fluid communication with the at least one channel.

* * * * *